3,284,477
DIURETIC 1,4,9(11)-PREGNATRIENES
Richard C. Rausser, Union, and Eugene P. Oliveto, Glen Ridge, N.J., assignors to Schering Corporation, Bloomfield, N.J., a corporation of New Jersey
No Drawing. Filed July 10, 1963, Ser. No. 294,150
5 Claims. (Cl. 260—397.45)

This invention relates to a new series of steroidal trienes and to methods for their preparation. More particularly, this invention relates to certain unique 16α- and 16β-lower alkyl substituted 1,4,9(11)-pregnatrienes which are useful not only as intermediates in the preparation of 9α-halo-16(α or β)-lower alkyl derivatives of prednisone, prednosolone and the 21-esters thereof, but themselves display physiological activity.

The novel compounds of this invention may be represented by the following formula:

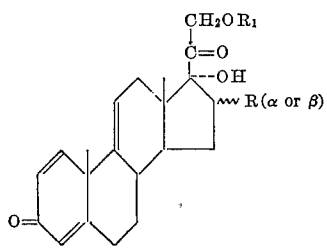

wherein R represents lower alkyl (preferably methyl) and $R_1$ represents H or lower alkanoyl.

The novel compounds of this invention are prepared from a 16(α or β)-lower alkyl prednisolone 21-acylate by dehydration of the 11-hydroxy group so as to yield the corresponding 9(11)-triene. Preparation of the starting materials and their conversion into the trienes of this invention is fully disclosed in copending United States application Serial No. 733,843, filed May 8, 1958, now United States Patent 3,164,618, issued January 5, 1965, of which the instant application is a continuation-in-part.

Also disclosed in said copending application are processes for converting the trienes of this invention into the aforementioned 9α-halo-16(α or β)-lower alkyl derivatives of prednisone, prednisolone and the 21-esters thereof. These compounds, and particularly 16(α or β)-methyl-9α-fluoroprednisolone and its 21-esters, are potent anti-inflammatory agents useful in the treatment of rheumatoid arthritis and other diseases requiring adrenocorticoid therapy.

In addition to their value as intermediates, the novel trienes of this invention surprisingly have been found to display physiological activity as diuretic agents. Administration of these trienes results in a marked increase in the urinary elimination of water. The trienes of this invention, therefore, are valuable therapeutic agents for the treatment and control of edmatic conditions.

In general, dehydration of the 11-hydroxylated starting material is effected by treating said starting material (16α or 16β-methyl prednisolone acetate for example) with an alkyl or aryl sulfonyl chloride (methane-sulfonyl chloride or p-toluene-sulfonyl chloride for example) in alkaline organic media (pyridine for example) at room temperature for 5 to 6 hours. The reaction mixture is then poured into a mixture of ice and strong acid (hydrochloric acid for example) and the solid triene-21-acetate so produced is separated by filtration and purified by recrystallization from a suitable organic solvent (acetone, hexane or a mixture thereof for example).

Where the free alcohol is desired, the 21-acetate as prepared above is reacted with standard hydrolytic agents (aqueous methanolic sodium or potassium bicarbonate, sodium hydroxide, sodium carbonate or sodium alkoxide such as sodium ethoxide for example). The hydrolysis may be carried out by refluxing the acetate and the hydrolytic agent in a suitable organic solvent, methanol for example) for approximately ½ hour. The reaction mixture is concentrated to approximately ½ the volume in vacuo and water is added. The precipitated 21-ol is filtered, dried and purified by recrystallization from a suitable organic solvent (methanol for example). The free alcohols, where desired, may be re-esterified at C–21 by treatment with any desired lower alkanoyl acylating agent according to conventional processes.

The following examples will more fully illustrate the best mode contemplated by applicants for carrying out their invention:

EXAMPLE 1

*16α-methyl-1,4,9(11)-pregnatriene-17α-21-diol-3,20-dione 21-acetate*

To a solution of 0.5 g. of 16α-methyl-1,4-pregnadiene-11β,17α,21-triol-3,20-dione 21-acetate in 3.0 ml. of pyridine add with stirring 0.3 ml. of methane-sulfonyl chloride in 4.0 ml. of pyridine. Stir the mixture at room temperature for 6 hours, then pour into ice-hydrochloric acid. Remove the precipitate by filtration and recrystallize from acetone-hexane.

EXAMPLE 2

*16α-methyl-1,4,9(11)-pregnatriene-17α,21-diol-3,20-dione*

Dissolve 0.5 g. of 16α-methyl-1,4,9(11)-pregnatriene-17α,21-diol-3,20-dione 21-acetate in 20.0 ml. of methanol and 2.0 ml. of water containing 0.1 g. of potassium bicarbonate. Reflux the solution for ½ hour, then concentrate to ½ the volume in vacuo. Add water and recover the resulting precipitate by filtration. Recrystallize from methanol.

EXAMPLE 3

*16β-methyl-1,4,9(11)-pregnatriene-17α,21-diol-3,20-dione 21-acetate*

At room temperature stir for 5 hours a mixaure of 0.5 g. of 16β - methyl-1,4-pregnadiene-11β,17α,21-triol-3,20-dione 21-acetate in 3.0 ml. of pyridine and 0.3 ml. of methane-sulfonyl chloride in 4.0 ml. of pyridine. Pour the mixture into ice-hydrochloric acid and separate the resulting precipitate by filtration. Recrystallize from acetone.

EXAMPLE 4

*16β-methyl-1,4,9(11)-pregnatriene-17α,21-diol-3,20-dione*

Dissolve 0.5 g. of 16β-methyl-1,4,9(11)-pregnatriene-17α,21-diol-3,20-dione 21-acetate in 20.0 ml. of methanol and 2.0 ml. of water. After refluxing the solution for approximately ½ hour, concentrate to ½ the volume in vacuo and add water. Recover the resulting precipitate by filtration and recrystallize from methanol.

The foregoing examples illustrate the preparation of 16α- and 16β-methyl compounds. Similarly, by starting with other 16(α or β)-lower alkyl derivatives of prednisolone 21-acylate, such as ethyl, butyl, and the like, the corresponding 16-lower alkyl-21-acylate or free alcohol may be prepared. These, and other 16-lower alkyl derivatives, are also described in the aforementioned copending application.

The subject matter which applicants regard as their invention is particularly pointed out and distinctly claimed as follows:

1. A compound having the formula:

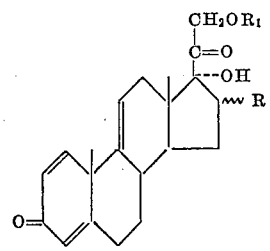

wherein R is a lower alkyl group and $R_1$ is a member of the group consisting of H and lower alkanoyl.

2. 16α-methyl-1,4,9(11)-pregnatriene - 17α,21 - diol-3,20-dione 21-acetate.

3. 16α-methyl-1,4,9(11)-pregnatriene - 17α,21 - diol-3,20-dione.

4. 16β-methyl-1,4,9(11)-pregnatriene-17α,21-diol-3,20-dione 21-acetate.

5. 16β-methyl-1,4,9(11)-pregnatriene - 17α,21 - diol-3,20-dione.

References Cited by the Examiner

UNITED STATES PATENTS 3,004,994  10/1961  Arth et al. _____ 260—397.45

OTHER REFERENCES

Fried et al., J. Amer. Chem. Soc., 77, pp. 4181 and 4182 (1955).

LEWIS GOTTS, *Primary Examiner.*

T. M. MESHBESHER, *Assistant Examiner.*